Patented Sept. 5, 1939

2,172,307

UNITED STATES PATENT OFFICE 2,172,307

PROCESS FOR THE MANUFACTURE OF COLORED PHOTOGRAPHIC MATERIALS AND MATERIAL THEREFOR

Béla Gáspár, Brussels-Forest, Belgium

No Drawing. Application May 28, 1937, Serial No. 145,382. In Germany May 30, 1936

19 Claims. (Cl. 95—6)

Photographic materials which are dyed by means of azo dyes are already known. Such dies have already been employed both for the coloring of filter-layers and for the formation of a colored picture. For the production of such materials, the dye was either previously produced and then incorporated into the gelatine, the emulsion or the coated layer; or the dyestuff was produced within the emulsion or the gelatine by diazotising and coupling from the components used in the usual azo dye synthesis. In the later case one can also produce insoluble azo dyes of the developing or ice-dye type and such dye-stuffs have been produced in filter layers and anti-halation layers. Insoluble azo dyes have further been used for the production of colored pictures by starting from an uncolored photographic silver picture and locally synthesizing the azo dyes in an imagelike distribution.

In accordance with the present invention colored photographic materials are produced by incorporating, into the layers or into the solution used for their production, addition compounds, derived especially from already formed azo dye-stuffs, the said addition compounds being soluble and capable of being split up to regenerate the azo dyestuffs. The derivatives may be split up during, or subsequent to, their incorporation into the binding agent, emulsion or layer.

Dye derivatives useful for this purpose are particularly the addition products formed by azo dyestuffs and bisulfite and aldehydebisulfite compounds and in order to describe the principle of my invention I will describe the process as applied to these bisulfite compounds before describing the use of other suitable splittable dye stuff derivatives. These compounds are more or less easily soluble in water and can be split up into the dyes in most cases, by means of simple reagents, which are quite harmless to photographic materials. The color of these addition products differs from the original dyes and if desired use may be made of this fact for color photographic purposes.

For carrying out the process both the soluble and more particularly the insoluble azo dyes which give addition compounds with bisulfite or aldehydebisulfite compounds are suitable. An advantage of the process results principally from the fact that one can avoid the synthesis of the azo dyes in photographic materials, which process is known to be none too reliable and tends to give a secondary reaction as, for example, a coupling of the diazo compound with itself whereby the bulk of the resulting dye as well as the color shade are altered. On the other hand, if one starts with a given quantity of the desired dyestuff and incorporates it into the layer in the form of a compound which can be readily split up again then the shade as well as density of color are exactly predetermined. The splitting up of the dye-derivatives into the material for coloring takes place according to the manner in which the material should be utilized. If the manufacture of filter layers or antihalation layers is intended, then the splitting up must be effected prior to the exposure. If on the other hand the production of color layers is intended, whose dyes are to serve as image forming colors, then it is occasionally advantageous to effect the splitting up only after the exposure. In this case the addition compounds of the dyes can be split up either before or after the development of the silver picture. It is possible to incorporate them after the silver image has been developed and to produce the dyestuff picture by means of local dye destruction subsequent to the splitting up of the dyes. There exists also the possibility of locally destroying compounds by means of light; or in a layer containing metallic deposit images there is the possibility of the application of a local destructive agent to form a compound locally which no longer gives the dye, so that one can proceed with the splitting up of the remainder.

The addition compounds or derivatives required for the process of the invention can be produced from a large number of dyes. For the production of the bisulfite compounds of insoluble "azo" dyes the reaction was performed in the presence of ethyl alcohol and chloroform. Thus 1 gram of the dye Parared produced from p-Nitraniline by diazotisation and coupling with Beta-Naphthol were boiled with 9 grains of bisulfite and 35 ccm. water, 25 ccm. chloroform and 35 grams of alcohol at the reflux condenser until the original red dye had completely disappeared and the solution was of yellow orange color.

The yellow bisulfite compound forms yellow crystals after the distillation of the chloroform and partial distillation of the alcohol. It is easily soluble in warm water and was recrystallised from warm water of 60° C.

In similar fashion the bisulfite compound of the orange red dye obtained by means of diazotized 2,5 Dichloraniline coupled with Beta-Naphthol was produced. In this case 0,5 of a gram of dye with the above mentioned mixture of water, chloroform and ethyl alcohol were boiled for 3 hours at the reflux condenser. Here also the chloroform and a portion of the alcohol were distilled. After the cooling off the bisulfite compound crystallises in the form of small yellow crystals. These were then filtered and washed in cold distilled water.

For the carrying out of the invention the aldehydebisulfite compounds of dyes may further be used from which the radical—$CH_2CO_3H$ can be split up by alkaline solutions thus restituting the dyestuff. Such compounds can, as is known, be produced from sodium methylaniline omega sulfonate or from similar bodies by coupling with diazo solutions. From the above-mentioned methylaniline omega sulfonate and diazotised p-nitraniline a dyestuff derivative is obtained which by alkaline solutions is split up to a red dye. This method which is capable of general application, can be used for the manufacture of other dyes by the choice of other components. The following examples serve to show the many-sided application for the new working method described.

*Example 1.—Producing a filter layer.*—To a solution of 6 grams of gelatine in 60 grams of water, an aqueous solution warmed to 40° C. of 1 gram of bisulfite compound of Parared is added. Of the gelatine now colored yellow 10 ccm. are poured on to a glass plate of 100 sq. cm. surface. After drying, the layer is washed in an aqueous sodium carbonate solution. The yellow layer thus turns orange-red.

Particularly suitable for the present invention are further the bisulfite and aldehydebisulfite addition products and N-alkyl-omega-sulphonic acids derived from polyazodyes. By the employment of compounds derived from and capable of being split up to disazodyes and polyazodyes the scope of the dye shades obtainable is extended. Further the polyazo dyestuffs possess in general a considerably higher degree of insolubility.

*Example 2.*—0.5 of a gram of the red dyestuff made from the diazotised p-nitraniline by coupling with o-anisidine, diazotising the obtained monoazodye and coupling with the sodium salt of N-Methyl alphanaphthylamine-omega-sulphonic acid, are dissolved in 100 ccm. of hot water. To this solution is added at 80° C., 50 ccm. of gelatine solution with a 20% gelatine content the whole mixture being well stirred. By adding 5 ccm. of a 10% ammonia solution to the colored gelatine the red polyazodyestuff is finely precipitated in the gelatine. The whole is then stirred for say a further half hour at a temperature of about 50° C. Then the dyed gelatine is allowed to cool and then washed. For producing filter layers the dyed gelatine is again melted and then poured on a surface of ½ sq. m., for example, on top of a silver halide gelatine layer applied to a Celluloid film.

For producing light filters the dyed gelatine produced according to Examples 1 and 2 can be used alone if coated on to a glass plate. Or antihalation layers may be produced by arranging the layers behind a light sensitive emulsion layer.

*Example 3.—Producing a light sensitive emulsion.*—A light sensitive film is treated for 10 minutes with a 0.2% aqueous solution of bisulfite compound of Parared and dried. After exposure the film is washed in a weak solution of sodium carbonate, then the picture is developed and fixed. A black silver picture in the red dyed film is thus obtained.

Instead of soaking the light sensitive layer with the bisulfite compound, the latter may be incorporated during the preparation of the light sensitive silver halide emulsion, either by adding 1% of the bisulfite compound to the gelatine solution or to the silver halide gelatine emulsion. The bisulfite compound may be split up before coating the emulsion or within the coated light sensitive layer.

*Example 4.*—4 ccm. of the dyed gelatine prepared in accordance with Example 2 are washed and again melted up and then mixed with 3 ccm. of silver halide emulsion. This emulsion is sensitized for red by pinacyanol and poured on to a plate of 100 sq. cm. surface.

*Example 5.—Splitting up of the dyes before exposure.*—A light sensitive film is soaked for 15 minutes in the solution of the bisulphite compound of Parared and then treated in a 0.25% solution of carbonate of sodium. Thereafter the film is sensitized for red light. The film is exposed, developed and fixed. The sensitivity for red light of this film, as compared with an undyed test film sensitized in the same manner was not materially decreased. The dye produced in insoluble form within the emulsion before the addition of the sensitizer, has in this case no influence on the latter. It is known that the sensitiveness of dyed films is frequently decreased by a mutual reaction between the dyestuff and the sensitizer.

*Example 6.—Producing of colored pictures by splitting up the dyestuff derivative after exposure.*—A gelatine layer is dyed yellow by treating it with a solution of the bisulfite compound of Parared. To this solution are further added a small quantity of thiosinamine and potassium bisulphate. After drying the layer is bleached in the sun for a good half hour under a black and white pattern. If the layer is treated thereafter for a few seconds in a 1% sodium hydroxide solution when the pattern will be obtained in the red layer.

*Example 7.—Production of a dyestuff picture by destruction of the dye.*—A light sensitive emulsion, in which by a method analogous to that described in Example 3, 4 and 5 the dyestuff from diazotized 2,5-dichlor-aniline and Beta-Naphthol has been homogeneously distributed by splitting up its bisulphite compound, is exposed and developed and fixed. The image is treated with a solution of thiocarbamide for about 5 minutes. It is recommended for the local destruction of these insoluble dyes, and for instance also for the Parared, to use a high concentration of the dye destroying agent. Higher amounts of thiocarbamide can be dissolved in the treating bath if alcohol, methylic alcohol or acetone or other organic solvents miscible with water are added to the dye-destroying bath. Dyestuff images that are free or almost free of silver may, for instance, be obtained within the above-mentioned period of treatment in a bath of the following formula, viz:

| | | |
|---|---|---|
| Thiocarbamide | g | 18.5 |
| Hydroquinone | g | 8.0 |
| Methylalcohol | ccm | 30 |
| Concentrated hydrochloric acid | ccm | 2 |
| Water | ccm | 100 |

*Example 8.—Production of a dyestuff picture by local destruction of the dyestuff derivative and subsequent splitting up.*—A light sensitive film is treated for 10 minutes in a 0.2% aqueous solution of the bisulfite compound of Parared and exposed after drying, developed in a neutral or acid developer and fixed in an acid fixing bath. For the destruction of the dyes the solution employed in the Example 7 may be used but in this case the local destruction of the dyes is completed in a shorter time. As the bisulfite compound is soluble in water it is suitably fixed first in known manner by the precipitation of an insoluble salt for example by producing the diphenylguanidine salt. After the treatment with the dye destroying bath the yellow dyestuff derivative is transformed into the insoluble red dye by a treatment with diluted sodium carbonate solution.

Example 9.—Production of black dyestuff pictures.—A silver picture is colored after fixing with a mixture of bluegreen dye and a yellow bisulfite compound, which after splitting up gives a red dye. The glue green dye may be for instance Diamine pure blue FF (Schultz Farbstofftabellen, 5-edition 424) and the yellow dyestuff derivative may be the bisulfite compound of Parared. The destruction of the dye is effected, after the splitting up, by means of the thiocarbamide bath referred to in Example 7. The employment of such a mixture of dye, whose absorption remains unchanged, with a dyestuff derivative which changes its absorption when split up after exposure, is particularly advantageous for a light sensitive material. For instance, the mixture specified above may be used for the dyeing of a light sensitive material which appears green before exposure and therefore may be made sensitive to green light. The result after exposure, is a black coloring of the film which had it been in existence before, would have prevented the exposure of the material.

The aforegoing examples are given to explain the principle of the invention and to show some advantages obtained by the use of dyestuff derivatives or addition compounds of "azo" dyes, which derivatives are capable of being split up by hydrolysis in photographic colloids. These advantages consist, on the one hand, in the easy and reliable incorporation of insoluble dyes, and on the other hand, in the possibility of changing the color shade in the exposed or unexposed material. This possibility exists even when the dye itself is not insoluble, but the insoluble dyes are preferred and therefore in the examples the working methods are described as applied to the latter. Bisulfite compounds of soluble dyestuffs may be employed in the form of their insoluble salts. In this way from Ponceau 3R (Schultz l. c. 83) by boiling with sodium bisulfite solution an orange red solution is obtained with which the gelatine is colored. The dyestuff-bisulfite compound is then fixed in the layer with a barium nitrate solution. By treatment with alkaline solutions the insoluble barium salt can be split up to a red dye, the barium salt of which is also difficultly soluble. For the destruction of the dye an aqueous thiocarbamide solution is sufficient in this case, containing 5% thiocarbamide and 2½% citric acid.

In a similar manner insoluble aminoazodyestuffs can be incorporated into the solutions serving for the production of photographic layers or into the finished layers themselves, if instead of the addition compounds mentioned above other soluble derivatives of aminoazodyestuffs are used. Particularly suitable are the salts of sulphaminic acids. In the compounds the nitrogen atom of the amino group linked to the carbon atom of the azodyestuff molecule is attached to the acid radical of sulphuric acid, and the linkage is —NH—SO₂—OH. Therefore for dyeing a photographic layer or light sensitive silver halide emulsion with the red dye obtainable from diazotised p-nitraniline and beta-naphthylamine, the p-nitrobenzol-azo-beta-naphthyl-sulphaminic acid NO₂—C₆H₄—N=N—C₆H₄—NH—SO₃Na may be used. This salt can be produced by using instead of beta-naphthylamine required as coupling component the sodium salt of sulphuric acid beta-naphthalide then coupling it with diazotised p-nitraniline outside the gelatine or emulsion in the usual manner. The sodium salt is soluble in water and resistant to boiling and can easily be mixed with the usual solution employed for the production of photographic layers or with the sensitized emulsions before pouring or it may be applied by treating a photographic layer with a solution of the salt. In a weak acid solution the sulphaminic acid may be hydrolysed to form the insoluble dyestuff and this may be done either before the pouring of the emulsion or in the photographic layer, either before or after exposure.

A special bath is not always necessary if, for example, the splitting up is effected, after the exposure, in a photographic treatment bath of sufficient acidity. As compared with the addition compounds derived from oxyazodyes mentioned above, the salts of sulphaminic acids are in most cases of a greater solubility and distinguished by their capacity of being hydrolysed by acid whereas the salts of alkyl omega sulphonic acids are preferably hydrolysed by means of alkaline treating solutions. The aminoazodyes may be split off, before or after the exposure, and in both cases the dyestuff is obtained in extremely fine distribution in the layer, without the presence of disturbing flakes or small pigment particles. Also the color shades are considerably clearer than if the dyestuff had been produced in the layer itself from its components.

Example 10.—100 ccm. of a 0.5% aqueous solution of the dyestuff obtained from diazotised p-nitraniline through coupling with the sodium salt of beta-naphthyl-sulfaminic acid are added at about 80° C. to 50 ccm. of a 20% gelatine solution. The solution is carefully stirred and during this period 10 ccm. of a 5% sulphuric acid are added. The dyed gelatine is kept for about an hour at a temperature of 50–60° C. whereby the red insoluble dyestuff is formed. The gelatine is then allowed to solidify, disintegrated, washed and then after the remelting poured as a filter layer on ½ sq. m. surface of silver halide emulsion layer.

Example 11.—The colored gelatine produced and washed in accordance with Example 10 is mixed with about the same quantity of silver halide gelatine. For example, 4 ccm. of the colored gelatine is mixed with 3 ccm. silver halide emulsion and poured on a plate measuring 9 x 12 cm.

In place of the dyestuff used in the Examples 10 and 11 the red dyestuff obtained from diazotised nitrotoluidine (CH₃:NH₂:NO₂—1,3,6) through coupling with the sodium salt of beta-naphthy-sulfaminic acid can be used or The blue dyestuff made from tetrazotised dianisidine by coupling with the sodium salt of α-naphthyl-sulfaminic acid or The red-violet dyestuff made from diazotised p-nitraniline and the sodium salt of α-naphthyl-sulfaminic acid or The purple-red dyestuff made from diazotised p-nitraniline and the sodium salt of beta-methoxy α-naphthyl-sulfaminic acid, the yellow dyestuff made from diazotised aniline and the sodium salt of phenylsulfaminic acid may be used for the purposes of the invention.

The colored light sensitive emulsion may be optically sensitised before or after the splitting up of the dyestuff. One obtains by this means light sensitive photographic materials, which contain for the final picture formation the requisite dyestuff in the form of an azodye, especially an oxy- or amino-azo dyestuff insoluble in water. Such materials are particularly suited for the purpose of colored photographic pictures as the insoluble azodyestuffs have no harmful effects on the emulsion, they affect the sensitivity of the layers to no appreciable degree and for the formation of the final picture they can be relatively easily destroyed locally. For the local dyestuff destruction in colored pictures which are dyed with insoluble monoazodyestuffs and polyazodyestuffs, oxyazodyestuffs, aminoazodyestuffs, either the solutions described in my prior Patent No. 2,020,775 of November 12th 1935 may be used or organic solvents may be added as above explained. Insoluble aminoazodyestuffs may also be formed from soluble derivatives, other than the sulfaminic acids. Derivatives which are capable of being split up by reagents which are harmless to the photographic layers or the gelatine are, for example, the so-called "Schiff'sche" bases formed by the aminoazodyes and aromatic aldehydes which contain in their aromatic nucleus one or more sulphonic acid groups which make the compounds soluble in water. For example, by the sulphonation of benzaldehyde in the known manner the benzaldehyde sulphonic acid may be produced which forms a Schiff's base with naphthylamine. This bas couples with diazotised p-nitraniline to a red dyestuff. The dyestuff is in the form of its sodium salt soluble in water. It is added to the gelatine and split up by a treatment of hydrochloric acid at a moderate temperature. The gelatine is washed and then used in this form for filter layers, or in a mixture of silver halide emulsion for light sensitive materials.

Other derivatives of polyazodyestuffs which may be used are the combinations nitraniline→o-anisidine→naphthylaminemethylomegasulphonic acid (red dyestuff) and

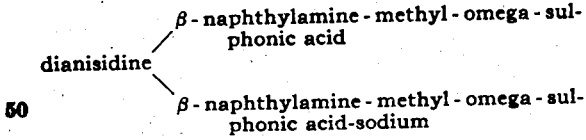

(yellow orange dye). By means of the light sensitive, dyed layer, dyestuff pictures can be produced by local destruction of the dyestuff, for example, by a solution of thiocarbamide as described above. For the production of multi-layer material the invention can also be applied and all the layers may be dyed with dye derivatives which allow of splitting up. One can also combine layers dyed in the usual way, for instance with water soluble dyes and fixed by precipitation of the soluble dyes, with layers containing dyestuff derivatives according to the invention. If, for instance, one layer is dyed with a blue dye such as diamine pure blue and the other layer dyed red-orange with a yellow bisulfite compound, such as the bisulfite compound of a dye obtained from diazotized 2,5 Dichloroaniline and β-naphthol the blue upper layer being sensitised for blue light and the yellow layer lying below or on the back of the film being sensitised for green light, the film can be exposed from one side. After the splitting-up of the bisulfite compound an orange red color is obtained which can serve for two-color reproduction.

Similarly double coated films may be used as a part of a bipack exposure material or three layers may be united to form a monopack. In this case, of course, as in all others, the color shade of the final dyeing or the final picture can be influenced by using a mixture of different dye-derivatives and, for instance, the yellow bisulfite compound of the dye obtained from 2,5 Dichloroaniline and β-naphthol may be mixed with the yellow bisulfite compound of Parared so that instead of the orange-red color, a red-orange color is obtained.

Some other compounds which can be employed are obtained in the following member: 0.5 gram of the dye obtained from diazotized Diaminostilbendisulphonicacid by coupling with 2-oxy-3-naphthoic acid are mixed with 50 ccm. of a 20% solution of sodium bisulphite. The red dye changes its color and becomes blue-green. At boiling point it is completely dissolved and a clear yellow-colored solution is obtained. This yellow solution colors gelatine yellow and is split up in the layer with a 20% sodium hydroxide solution to a red-violet dye. Silver pictures which are dyed with the yellow solution give reversed dyestuff pictures after splitting up with an acid thiocarbamide bath. 0.1 gram of the red dye from diazotized α-naphthylamine and 2-oxy-3-naphthoic acid are dissolved in 5 ccm. of chloroform. 5 ccm. of alcohol and 15-20 ccm. of a 20% sodium bisulfite solution are added. The whole is refluxed for about an hour, then the chloroform is distilled off and the mass boiled for another hour. The hot solution is filtered and on cooling a water soluble yellow precipitate is obtained. With the solution of this body gelatine is dyed. Upon treatment with alkaline solution the yellow color changes to purple-red. In the preparation of light sensitive layers and particularly for use for multi layer material where the insolubility of the split up dyes prevents diffusion and bleeding the splitting up may be effected before the sensitizing or after. The subsequent sensitizing is often preferable because the sensitizer in this case has no chance of reacting with the insoluble dyestuff and because the hydrolysing agents serving for the splitting up of the dye have no opportunity to influence the sensitizer. As described in Example 5 an ordinary positive film was soaked in the 0.1% solution of the bisulfite compound of the dyestuff obtained from diazotized 2,5 dichloraniline and β-naphthol. After 15 minutes it was treated with a 0.25% sodium hydroxide solution for 1 minute and washed for 5 minutes. The film was sensitized by a solution of 2 ccm. of pinacyanol 1:100 diluted with 50 ccm. water and 25 ccm. alcohol: duration 10 minutes. The exposure under a scaled wedge with white, red, and blue light gave in comparison with an undyed but otherwise equi-valent control-strip, a diminution of the blue sensitivity but only a very union diminuation of the red sensitiveness. The bisulfite compound of the Parared acts in similar fashion when sensitized with pinacyanol.

For the process of the present invention dyestuff derivatives may be used which are derived from organic dyestuffs other than those mentioned by way of example in the specification.

In general the dyestuff derivative contains a bi- or tri-valent inorganic atom, such as nitrogen or oxygen linked to a carbon atom of the organic dyestuff, and a radical imparting a salt forming character to the dyestuff, the latter being attached in hydrolysable linkage to the inorganic atom.

What I claim is:

1. The method of coloring a photographic material with an azo-dye which comprises dissolving within the colloid, used for the formation of a layer of the photographic material, a soluble derivative of said azo-dye, said derivative having an inorganic atom selected from the group consisting of oxygen and nitrogen linked to a carbon atom of the dyestuff molecule and the radical of a polybasic acid in hydrolyzable linkage with said inorganic atom, and splitting off the azo dyestuff from the dissolved derivative by hydrolysis.

2. The method of coloring a photographic material with an azo-dye which comprises dissolving within the gelatin solution used for the formation of a light sensitive silver halide emulsion layer on the support of the photographic material a soluble derivative of said azo-dye, said derivative being selected from the group consisting of acids and salts of said acids, said acids having an inorganic atom selected from the group consisting of oxygen and nitrogen linked to a carbon atom of the dyestuff molecule and an acid salt-forming radical in hydrolyzable linkage with said inorganic atom, mixing the gelatin solution with silver halide emulsion and splitting off the azo-dye from the dissolved derivative within the silver halide emulsion by hydrolysis.

3. The method of coloring a photographic material with the azo-dye which comprises dissolving within the gelatin solution used for the formation of a light sensitive silver halide emulsion layer on the support of the photographic material a soluble derivative of said azo-dye, said derivative being selected from the group consisting of acids and salts of said acids, said acids having an inorganic atom selected from the group consisting of oxygen and nitrogen linked to a carbon atom of the dyestuff molecule and an acid salt-forming radical in hydrolyzable linkage with said inorganic atom, mixing the gelatin solution with silver halide to form a light sensitive emulsion, coating the emulsion on to the support to form a light sensitive layer, exposing said layer and splitting off the dyestuff from the dissolved derivative by hydrolysis after the exposure.

4. The method of coloring a photographic material with an azo-dye which comprises dissolving within the light sensitive silver halide emulsion used for the formation of a light sensitive silver halide emulsion layer on the support of the photographic material a soluble derivative of said azo-dye, said derivative being selected from the group consisting of acids and salts of said acids, said acids having an inorganic atom selected from the group consisting of oxygen and nitrogen linked to a carbon atom of the dyestuff molecule and an acid salt-forming radical in hydrolyzable linkage with said inorganic atom, and splitting off the azo-dye from the derivative dissolved in the silver halide emulsion by hydrolysis.

5. The method of coloring a photographic material with an azo-dye which comprises incorporating into a silver halide emulsion used for the formation of a layer on the support of the photographic material a soluble derivative of said azo-dye, said derivative being selected from the group consisting of acids and salts of said acids, said acids having an inorganic atom selected from the group consisting of oxygen and nitrogen linked to a carbon atom of the dyestuff molecule and an acid salt-forming radical in hydrolyzable linkage with said inorganic atom, coating the emulsion layer on the support, exposing said emulsion layer to light and splitting off the dyestuff from the dissolved derivative within the layer by hydrolysis.

6. The method of coloring a photographic material with an azo-dye which comprises incorporating into a silver halide emulsion used for the formation of a layer on the support of the photographic material a soluble derivative of said azo-dye, said derivative being selected from the group consisting of acids and salts of said acids, said acids having an inorganic atom selected from the group consisting of oxygen and nitrogen linked to a carbon atom of the dyestuff molecule and an acid salt-forming radical in hydrolyzable linkage with said inorganic atom, coating the emulsion layer on the support, exposing said emulsion layer to light, developing said emulsion layer and splitting off the dyestuff from the dissolved derivative within the layer by hydrolysis after development.

7. In a process of coloring photographic materials which includes incorporating a soluble hydrolyzable derivative of an insoluble azo-dye into a colloid used for the formation of a photographic layer, said derivative being selected from the group consisting of acids and salts of said acids, said acids having an inorganic atom selected from the group consisting of oxygen and nitrogen linked to a carbon atom of the dyestuff molecule and an acid salt-forming radical in hydrolyzable linkage with said inorganic atom, the step which consists in treating said colloid and said dyestuff derivative simultaneously with a hydrolyzing agent, which does not adversely affect the said colloid.

8. In a process of coloring photographic materials which includes incorporating a bisulfite addition compound of an insoluble azo-dye into a colloid used for the formation of a photographic layer, the step which consists in treating said colloid and said bisulfite compound simultaneously with a hydrolyzing agent which does not adversely affect the said colloid.

9. In a process of coloring photographic materials which includes incorporating a bisulfite addition compound of an insoluble amino-azo-dye into a colloid used for the formation of a photographic layer, the step which consists in treating said colloid and said bisulfite compound simultaneously with a hydrolyzing agent which does not adversely affect the said colloid.

10. In a process of coloring photographic materials which includes incorporating a hydrolyzable derivative of an insoluble azo-dye into a colloid used for the formation of a photographic layer, said derivative being selected from the group consisting of acids and salts of such acids, said acids having a nitrogen atom linked to a carbon atom of the dyestuff molecule and a radical of a bivalent acid in hydrolyzable linkage with said nitrogen atom, the step which consists in treating said colloid and said dyestuff derivative simultaneously with a hydrolyzing agent which does not adversely affect said colloid.

11. In a process of coloring photographic materials which includes incorporating a hydrolyzable derivative of an insoluble azo-dye into a colloid used for the formation of a photographic layer, said derivative being selected from the group consisting of acids and salts of such acids, said acids having a nitrogen atom linked to a carbon atom of the dyestuff molecule and a radical of a bivalent oxygen acid of sulphur in hydrolyzable linkage with said nitrogen atom, the step which consists in treating said colloid and said dyestuff derivative simultaneously with a hydrolyzing agent which does not adversely affect said colloid.

12. The method of producing photographic dyestuff images which comprises incorporating into a photographic colloid, used for the production of a light sensitive silver halide emulsion layer on the support of a photographic material, a soluble derivative derived from and capable of being split up by hydrolysis to a substantially water-insoluble azo-dye, splitting off the azo-dye from the dissolved derivative within the colloid, prior to the exposure of the silver halide emulsion layer, by treating with a hydrolyzing agent, exposing the light sensitive layer, developing the silver image and destroying the azo-dye locally in proportion to the silver.

13. A light sensitive photographic material comprising a photographic colloid layer colored red by an insoluble amino-dis-azo dye in homogeneous distribution and a light sensitive silver halide in said layer.

14. A light sensitive photographic material comprising a photographic colloid layer colored red by an insoluble amino-dis-azo dye in homogeneous distribution, a light sensitive silver halide and a sensitizing dyestuff in said layer.

15. Light sensitive photographic material comprising a photographic colloid layer having a light sensitive salt and an ortho-oxy-azo-dye, which is insoluble in water and diluted alkali carbonate solution homogeneously distributed in the layer.

16. Light sensitive photographic material comprising a photographic colloid layer having a light sensitive silver salt, a sensitizer and an ortho-oxy-azo-dye, which is insoluble in water and diluted alkali carbonate solution homogeneously distributed in the layer.

17. A photographic treating solution, comprising a substance capable of destroying an azo-dye in the presence of a metallic silver image at the places where silver is present, a quantity of organic solvents, miscible with water in excess to the quantity of said dye destroying substance and a quantity of water in excess to the quantity of said organic solvents the concentration of dye destroying agent being in excess of that obtainable in a totally aqueous solution.

18. The method of producing photographic dyestuff images which comprises incorporating into a photographic colloid, used for the production of a light sensitive silver halide emulsion on the support of a photographic material, a soluble derivative derived from and capable of being split up by hydrolysis to a substantially insoluble azo-dye, exposing the light sensitive layer, developing the silver image, splitting off the azo-dye from the said derivative within the layer by treating with a hydrolyzing agent after exposure and destroying the azo-dye locally in proportion to the silver.

19. Light sensitive photographic material comprising a photographic colloid layer having a light sensitive silver salt and a derivative of an insoluble azo-dye distributed in the layer, the derivative being selected from the group of acids, soluble salts of said acids and insoluble salts of said acids, said acids having an inorganic atom selected from the group consisting of oxygen and nitrogen linked to a carbon atom of the dyestuff molecule and an acid salt-forming radical in hydrolyzable linkage with said inorganic atom.

BÉLA GÁSPÁR.